(12) United States Patent
Park et al.

(10) Patent No.: US 6,970,220 B2
(45) Date of Patent: Nov. 29, 2005

(54) LIQUID CRYSTAL DISPLAY HAVING IMPROVED CONTRAST RATIO AND COLOR REPRODUCTION WHEN VIEWED IN THE LATERAL DIRECTION

(75) Inventors: Seung-Beom Park, Seoul (KR); Kyeong-Hyeon Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 58 days.

(21) Appl. No.: 09/992,474

(22) Filed: Nov. 14, 2001

(65) Prior Publication Data

US 2002/0113931 A1 Aug. 22, 2002

(30) Foreign Application Priority Data

Nov. 14, 2000 (KR) .......................... 2000-67391

(51) Int. Cl.[7] ................. G02F 1/1337; G02F 1/1343; G09G 5/10
(52) U.S. Cl. ................. 349/129; 349/143; 349/144; 345/690
(58) Field of Search ................. 349/129, 143, 349/144; 345/690

(56) References Cited

U.S. PATENT DOCUMENTS

| | | | | |
|---|---|---|---|---|
| 4,832,454 A | * | 5/1989 | Walters ................. | 345/38 |
| 5,298,199 A | * | 3/1994 | Hirose et al. ................. | 264/2.6 |
| 5,309,264 A | * | 5/1994 | Lien et al. ................. | 349/143 |
| 5,646,705 A | * | 7/1997 | Higuchi et al. ................. | 349/143 |
| 6,229,589 B1 | * | 5/2001 | Koma ................. | 349/139 |
| 6,256,082 B1 | * | 7/2001 | Suzuki et al. ................. | 349/144 |
| 6,342,938 B1 | * | 1/2002 | Song et al. ................. | 349/143 |
| 6,407,791 B1 | * | 6/2002 | Suzuki et al. ................. | 349/129 |
| 6,573,965 B1 | * | 6/2003 | Liu et al. ................. | 349/129 |
| 6,577,366 B1 | * | 6/2003 | Kim et al. ................. | 349/139 |

FOREIGN PATENT DOCUMENTS

| | | | | |
|---|---|---|---|---|
| JP | 11352490 A | * 12/1999 | ......... | G02F/1/1335 |
| KR | 10-20000025569 A | 5/2000 | ......... | G02F/1/1343 |

* cited by examiner

*Primary Examiner*—Erik Kielin
(74) *Attorney, Agent, or Firm*—F. Chau & Associates LLC

(57) ABSTRACT

Pluralities of pixel electrodes having openings and thin film transistors are provided on a lower panel, a common electrode having apertures is provided on an upper panel, and a liquid crystal layer vertically aligned to the two panels is located between the lower and the upper panels. The upper and the lower polarizers having the perpendicular polarizing directions are provided on the outer surfaces of the upper and the lower panels, respectively. The voltage value of a first gray representing the darkest state applied between the pixel electrode and the common electrode is within a voltage range giving a contrast ratio to be equal to or higher than 0.8 with respect to contrast ratio when the voltage applied between the pixel electrode and the common electrode is zero. In this way, the contrast ratio and the color reproduction is improved, so that the image quality of a liquid crystal display is improved.

15 Claims, 22 Drawing Sheets

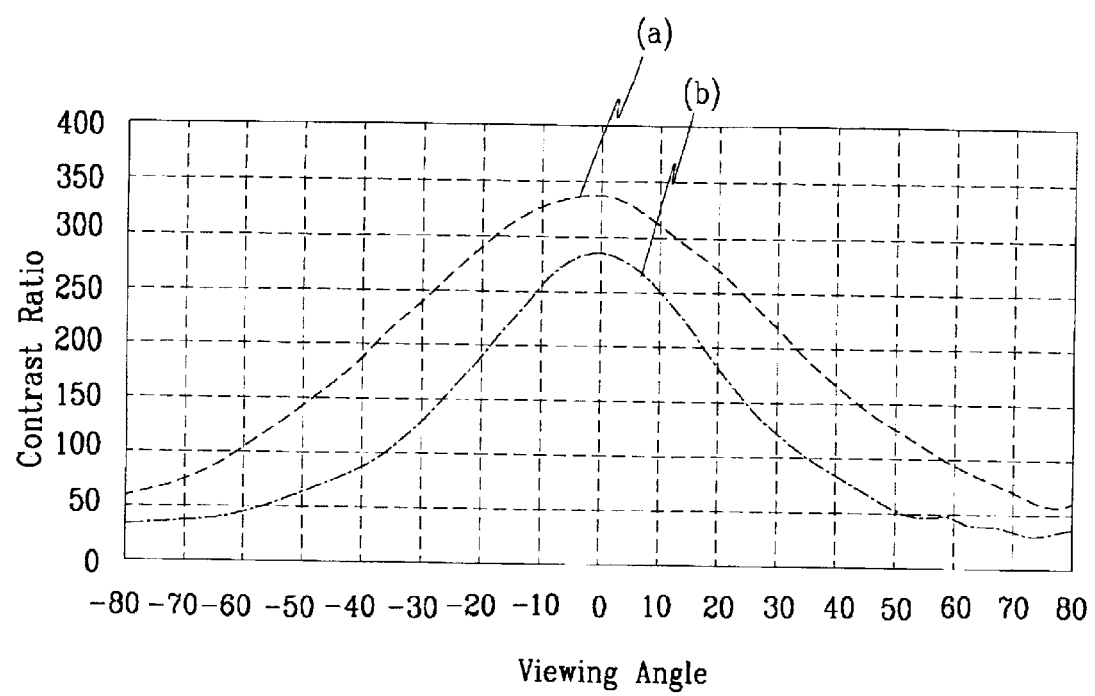

← Polarizing direction →

← Polarizing direction →

←————————→ Polarizing direction

Viewing Angle

LIQUID CRYSTAL DISPLAY HAVING IMPROVED CONTRAST RATIO AND COLOR REPRODUCTION WHEN VIEWED IN THE LATERAL DIRECTION

BACKGROUND OF THE INVENTION (a) Field of the Invention

The present invention relates to a liquid crystal display, more particularly, to a liquid crystal display having the improved image quality and viewing angle.

(b) Description of the Related Art

Generally, a liquid crystal display includes an upper panel having a common electrode and a plurality of color filters, a lower panel having pluralities of thin film transistors (TFTs) and pixel electrodes, and a liquid crystal layer between the two panels. The pixel electrodes and the common electrode are applied with different electric potentials to generate electric fields which vary the arrangement of liquid crystal molecules to control the light transmittance, thereby displaying images.

The initial arrangement of liquid crystal molecules can be, for example, horizontally twisted or vertically aligned. A vertically aligned structure can produce a relatively high contrast ratio and a relatively wide viewing angle. In a vertically aligned mode liquid crystal display, longitudinal axes of liquid crystal molecules are aligned perpendicular to the upper and the lower panels in absence of electric field. When electric field is applied, the liquid crystal molecules are tilted with respect to an axis normal to the panels at angles dependent on the strength of the electric field, so that the polarization of light passing through the liquid crystal layer can be changed. The larger the tilt angle of the liquid crystal molecules, the larger the amount of change in polarization. If the polarization axes of a polarizer and an analyzer opposite each other with respect to the liquid crystal layer are aligned to be perpendicular to each other, the light which is linearly polarized after passing through the polarizer experiences no change of the polarization in the liquid crystal layer in absence of electric field, thereby being almost completely intercepted by the analyzer. Accordingly, the screen of the liquid crystal display becomes black. However, when electric field is applied, the polarization of the linearly polarized light changes in the liquid crystal layer. Accordingly, when light reaches the analyzer, the light has a polarization component parallel to the polarization axis of the analyzer, and thus the light out of the analyzer is visible to users. Generally, the higher the strength of the electric field applied to the liquid crystal layer, the larger the magnitude of the polarization component parallel to the polarization axis of the analyzer, and the screen of the liquid crystal display becomes brighter.

Based on the above principle, a liquid crystal display realizes gray scale by adjusting the potential difference between the pixel electrodes and the common electrode. Generally, the gray scale ranges from the first gray representing the darkest state to the sixty-fourth gray representing the brightest state.

In the meantime, the contrast ratio of a liquid crystal display when viewed from its lateral sides is very poor compared with when viewed from the front of the display. The contrast ratio is defined as the luminance of the sixty-fourth gray divided by that of the first gray. In addition, the color reproduction when viewed from the lateral sides is inferior to that of the front view. A liquid crystal display having poor contrast ratio and inferior color reproduction cannot display bright and sharp images.

SUMMARY OF THE INVENTION

It is an object of the present invention to improve the contrast ratio of a liquid crystal display when viewed from the lateral sides.

It is another object of the present invention to improve the color reproduction of a liquid crystal display when viewed from the lateral sides.

It is still another object of the present invention to improve the image quality of a liquid crystal display when viewed from the lateral sides.

These and other objects are achieved by restricting the maximum value of the first gray voltage of a liquid crystal display to a predetermined value.

According to one aspect of the present invention, a liquid crystal display includes a first panel having inner and outer surfaces and a second panel facing the first panel and having inner and outer surfaces. A plurality of pixel electrodes and a common electrode are provided on one of the inner surfaces of the first and the second panels. A liquid crystal layer is disposed between the first and the second panels. Voltage value of a first gray representing the darkest state applied between the pixel electrode and the common electrode is within a voltage range giving a contrast ratio to be equal to or higher than about 0.8 with respect to contrast ratio when the voltage applied between the pixel electrode and the common electrode is zero. A pair of crossing polarizers are disposed on the outer surfaces of the first and the second panels and the liquid crystal layer is vertically aligned in absence of electric field. Domain-defining member for restricting the tilt directions of molecules in the liquid crystal layer is provided in one or both of the first and the second panels. The domain-defining member is openings in the pixel electrode or the common electrode. In this case, the voltage value of the first gray is equal to or lower than 1.4 V. Regions divided by the openings are classified into four domains depending on the tilt directions of the liquid crystal molecules.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein:

FIGS. 3A to 3D are graphs illustrating contrast ratios as a function of the viewing angle θ for azimuthal angles Φ of 0°, 45°, 90° and 135°, respectively, when the applied first gray voltage is 0 volt (a) and 1.7 volts (b);

DETAILED DESCRIPTION OF THE PREFERRED EMBODIMENTS

Figure 1A:
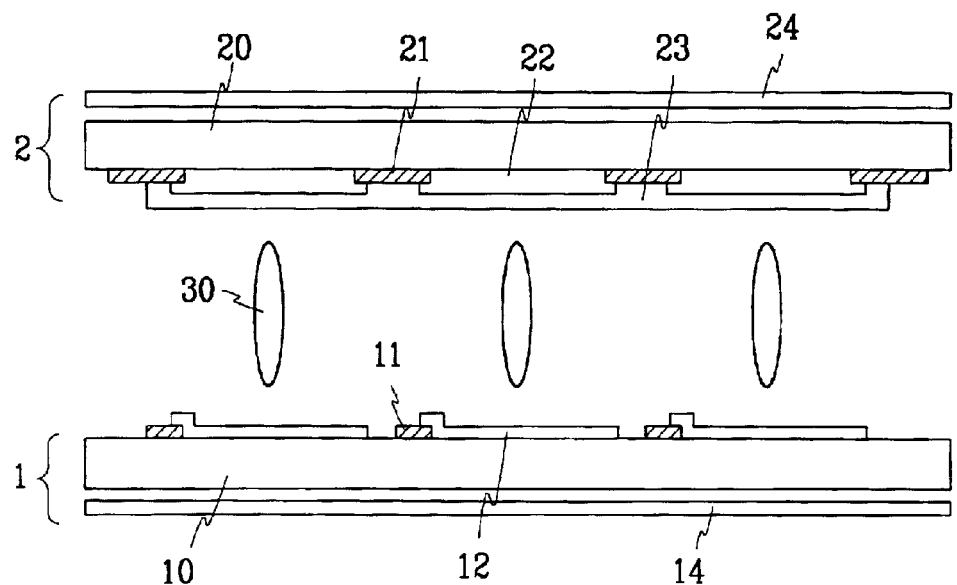
FIG. 1A is a sectional view of a liquid crystal display according to an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Figure 1B:
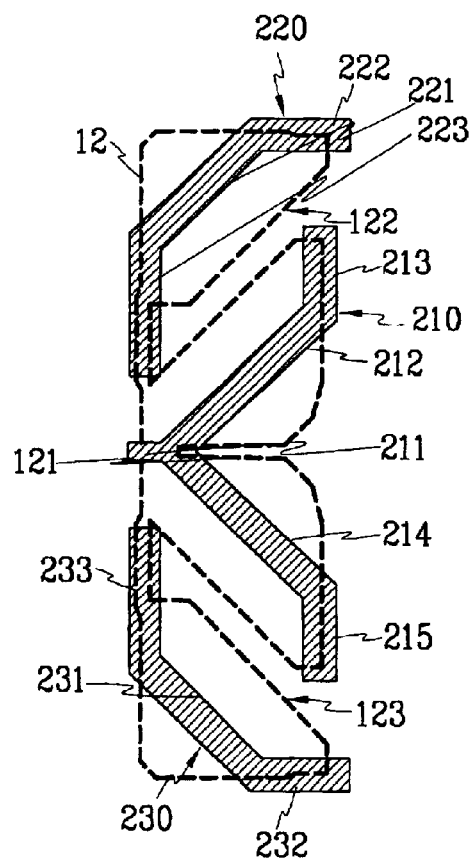
FIG. 1B is a schematic layout view illustrating the overlap between openings of a pixel electrode and apertures of a common electrode of a liquid crystal display according to the first embodiment of the present invention.

FIG. 1A is a sectional view of a liquid crystal display according to an embodiment of the present invention, and FIG. 1B is a schematic layout view illustrating the overlap between a pixel electrode and apertures of a common electrode of a liquid crystal display according to the first embodiment of the present invention.

A liquid crystal display according to this embodiment includes a lower panel 1, an upper panel 2 facing the lower panel 1, and liquid crystal molecules 30 vertically aligned between the lower and the upper panels 1 and 2.

A plurality of rectangular pixel electrodes 12 of transparent conductive material having openings are provided on the inner surface of a lower substrate 10 of transparent insulating material such as glass. Each pixel electrode 12 is connected to a respective switching element 11 such as a thin film transistor to be applied with image signals via the switching element 11. The switching element 11 is connected to both a gate line (not shown) transmitting scanning signals and a data line (not shown) transmitting image signals, and turned on/off responsive to the scanning signal to transmit the image signals to the respective pixel electrode 12. In addition, a lower polarizer 14 is attached to the outer surface of the lower substrate 10. In a reflective type liquid crystal display, the lower substrate 10 and the pixel electrodes 12 may be made of opaque material. In this case, the lower polarizer 14 is not required.

A black matrix 21 for preventing light leakage, a plurality of color filters 22 and a common electrode 23 of transparent conductive material such as ITO (Indium-Tin Oxide) or IZO (Indium-Zinc Oxide) having apertures are provided on the inner surface of an upper substrate 20 of transparent insulating material such as glass. The black matrix 21 or the color filters 22 may be provided on the lower substrate 10. In addition, an upper polarizer 24 is attached to the outer surface of the upper substrate 20.

The liquid crystal display according to this embodiment is in the normally black mode, where the polarizing directions of the lower and the upper polarizers 14 and 24 are aligned perpendicular to each other, and the screen becomes dark as the electric field generated by the pixel electrode and the common electrode to be applied to the liquid crystal molecules is reduced.

In this liquid crystal display, the apertures and the openings of the common electrode 23 and the pixel electrodes 12 are used for restricting the tilt directions of the liquid crystal molecules. The shapes and arrangement of the openings and the apertures according to the present invention will be described in detail.

As shown in FIG. 1B, there are provided three openings 122, 121 and 123 in the rectangular pixel electrode 12, which are arranged in a longitudinal direction. A middle opening 121 extends in a transverse direction from the right side of the pixel electrode 12 toward the left side. The corners of the pixel electrode 12 near the inlet of the middle opening 121 are chamfered at a smooth angle to be curved. Upper and lower openings 122 and 123 are provided in upper and lower portions of the pixel electrode 12 opposed to each other with respect to the middle opening 121. Each of the upper and the lower openings 122 and 123 starts at a proximal corner of the pixel electrode 12, away from the middle opening 121, and continues toward the middle opening 121 in a diagonal direction. In this embodiment, the upper and the lower openings 122 and 123 are symmetrical with respect to the middle opening 121.

The common electrode 23 includes three apertures 220, 210 and 230 arranged in the longitudinal direction. A middle aperture 210 has a stem 211 extending from the left side in the transverse direction, upper and lower oblique branches 212 and 214 extending from the end of the stem 211 obliquely upward and downward, respectively, and upper and lower longitudinal branches 213 and 215 extending from the ends of the upper and the lower oblique branches 212 and 214, respectively. The upper branch 212 is nearly perpendicular to the lower branch 214. An upper aperture 220 has a middle portion 221 extending parallel to the upper oblique branch 212, and transverse and longitudinal portion 222 and 223 extending from upper and lower ends of the middle portion 221 in the transverse and the longitudinal directions, respectively. The lower aperture 230 and the upper aperture 220 are symmetrically arranged with respect to middle aperture 210. That is, a middle portion 231 of the lower aperture 230 is arranged parallel to the lower oblique branch 214 of the middle aperture 210, and longitudinal and transverse portion 233 and 232 extends from the upper and the lower ends of the middle portion 231 in the longitudinal and the transverse directions, respectively. Such arrangement of the apertures 210, 220 and 230 is provided repeatedly on the common electrode 23.

The openings 121, 122 and 123 of the pixel electrode 12 and the apertures 210, 220 and 230 of the common electrode 23 divide the pixel electrode 12 into a plurality of areas to define domains. The openings 121, 122 and 123 of the pixel electrode 12 and the apertures 210, 220 and 230 of the common electrode 23 are alternately arranged. The openings 122 and 123 are parallel to the middle portions 221 and 231 as well as the oblique branches 212 and 214, respectively. These oblique openings 122 and 123, and portions 221 and 231, and branches 212 and 214 of the apertures 210, 220 and 230 form long edges of the areas, while the opening 121, the portions 222, 223, 232 and 233, the stem 211 and the branches 213 and 215 in the longitudinal or transverse directions form short edges of the areas.

The polarizing directions of the upper and the lower polarizers 14 and 24 are aligned in the transverse and the longitudinal directions, respectively, or vice versa.

In this structure, since most of the liquid crystal molecules applied with electric fields tend to tilt in the direction perpendicular to the long edges, there are four different average tilt directions to form four domains which generate wide viewing angle, and the number of the liquid crystal molecules tilting in the polarizing direction of the polarizers 14 and 24 decreases to reduce texture. In addition, since the arrangement of the liquid crystal molecules may be completed nearly immediately, the response time is very short.

The second embodiment of the present invention will be described with the accompanying drawings.

Figure 2:
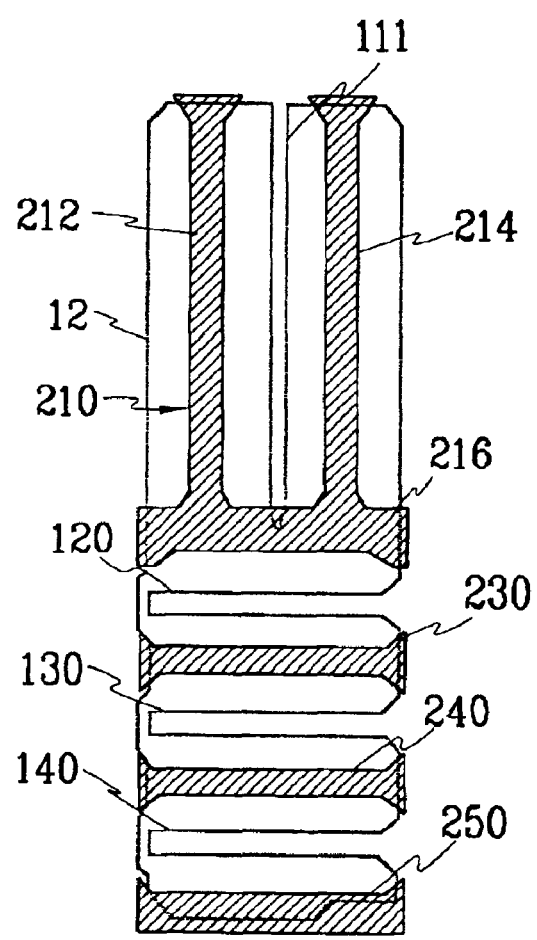
FIG. 2 is a layout view illustrating the overlap between the openings of a pixel electrodes and apertures of a common electrode of a liquid crystal display according to the second embodiment of the present invention.
Figure 3B:
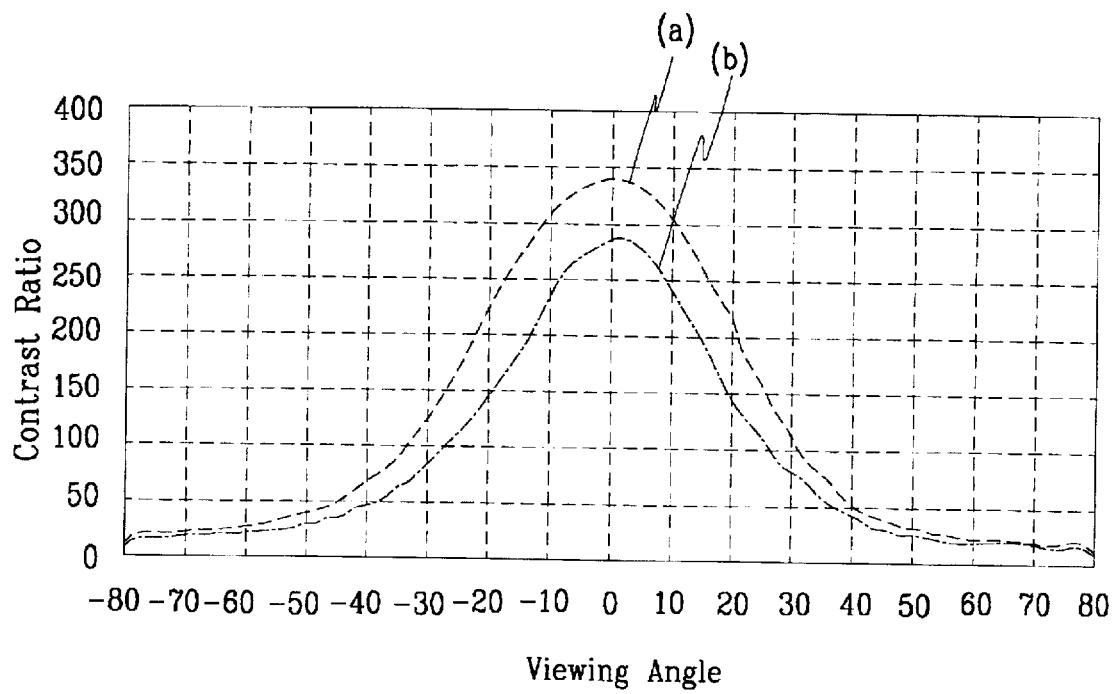
Figure 3C:
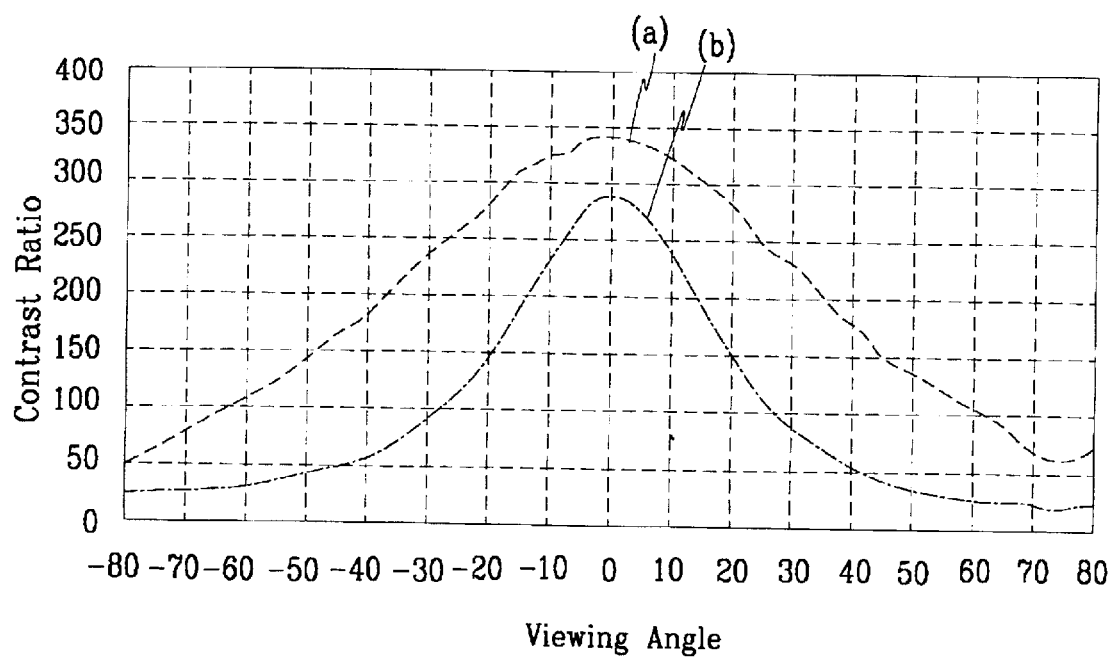
Figure 3D:
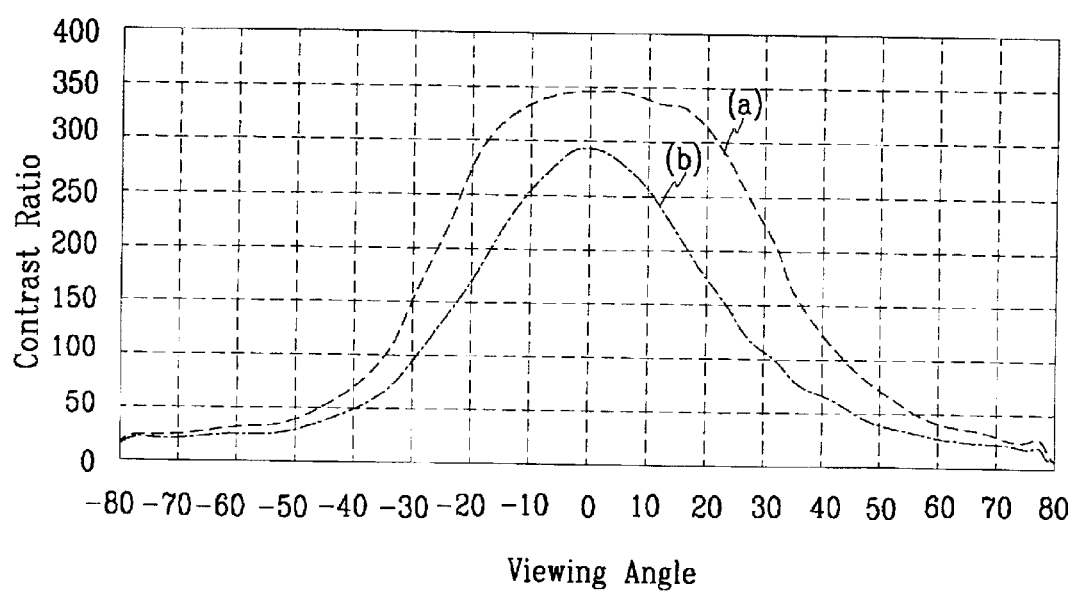
Figure 4A:
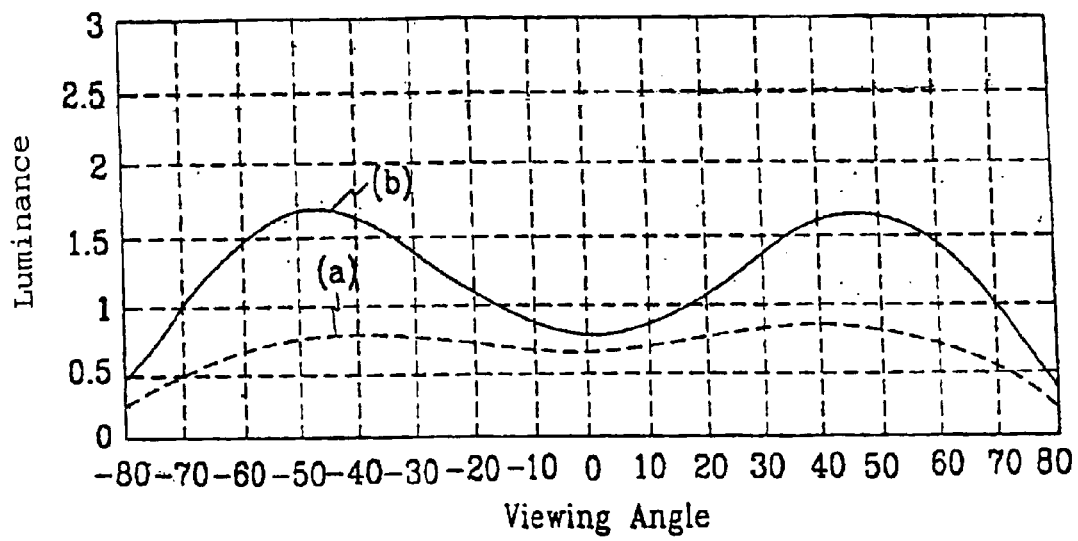
FIGS. 4A to 4D are graphs illustrating the luminance as a function of the viewing angle θ for azimuthal angles Φ of 0°, 45°, 90° and 135°, respectively, when the applied first gray voltage is 0 volt (a) and 1.7 volts (b)
Figure 4B:
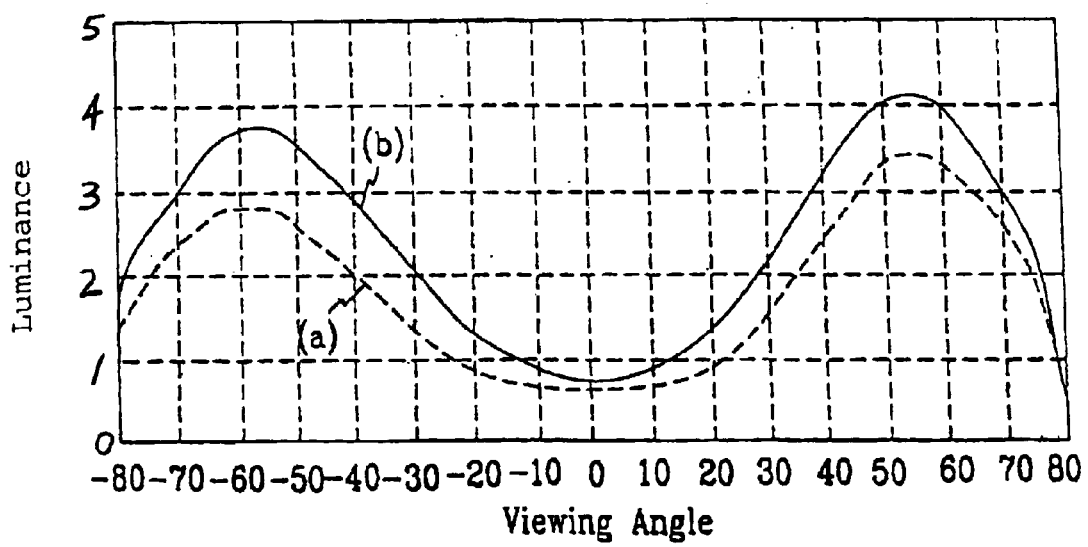
Figure 4C:
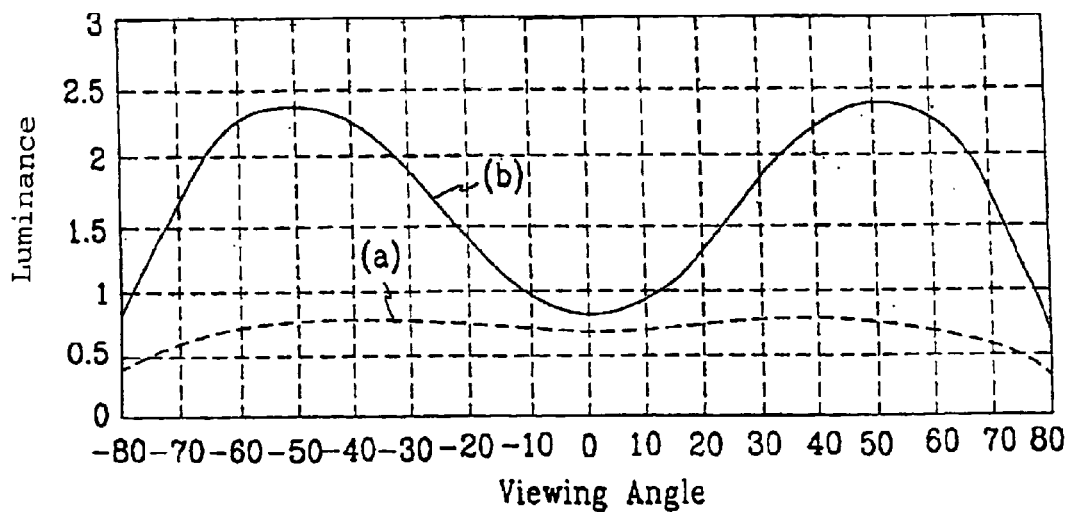
Figure 4D:
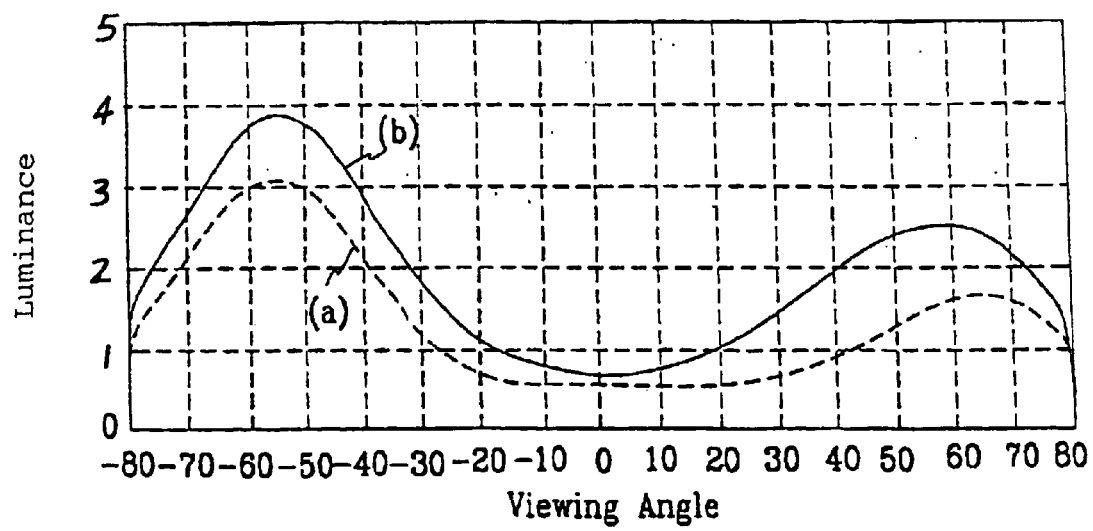

FIG. 2 is a layout view illustrating openings of a pixel electrode and apertures of a common electrode of a liquid crystal display according to the second embodiment of the present invention. The structure of the second embodiment is similar to that of the first embodiment except for the shapes of the openings and apertures.

The pixel electrode 12 includes a longitudinal opening 111 and three transverse openings 120, 130 and 140 arranged along the longitudinal direction. The longitudinal opening 111 extends downward from the upper edge of the pixel electrode 12, and divides the upper portion of the pixel electrode 12 into two partitions arranged in the transverse direction. The transverse openings 120, 130 and 140 extend leftward from the right edge of the pixel electrode 12, and divide the lower portion of the pixel electrode 12 into four partitions arranged along the longitudinal direction.

The common electrode 23 includes an upper aperture 210 having two longitudinal portions 212 and 214 and a transverse portion 216 connected thereto, and three lower transverse apertures 230, 240 and 250, and the upper and the lower apertures 210, 230, 240 and 250 are laterally arranged along the longitudinal direction.

Each of the two longitudinal portions 212 and 214 divides the respective upper partition into two areas, thereby forming four upper areas. The upper two 230 and 240 of the lower apertures 230, 240 and 250 divide the middle two of the lower partitions of the pixel electrodes 12, and the transverse portion 216 of the upper aperture 210 and the lowest aperture 250 form the upper and the lower edges of the lower portion of the pixel electrode 12.

The voltage of the first gray representing the darkest state in a liquid crystal display is confined in a range and this will be described in detail.

According to a preferred embodiment of the present invention, the voltage of the first gray is determined in a voltage range which gives the contrast ratio to be equal to or larger than about 0.8 in all viewing directions when compared to contrast ratio when applying 0 volt. The voltage range depends on the type of the liquid crystal panel. In the LCD according to the embodiments wherein the liquid crystal molecules are arranged vertical to the upper and the lower panels and the openings and the apertures are provided on both the pixel electrode and the common electrode, the voltage range of the first gray is within 0 volt to 1.4 volts. The reason for the limitation of the voltage range of the first gray will be described below.

Advantageously, lateral contrast ratio and lateral color reproduction of the liquid crystal display are largely improved.

FIGS. 3A to 3D are graphs illustrating contrast ratios as a function of the viewing angle θ for azimuthal angles Φ of 0°, 45°, 90° and 135°, respectively. The two curves are those when the applied first gray voltage is 0 volt (a) and 1.7 volts (b).

The voltage of 1.7 volts was chosen because the voltage of 1.7 volts is less than the threshold voltage where the transmittance starts increasing in the V-T (voltage-transmittance) curve measured in front of a liquid crystal display and because this voltage gives suitable voltage gaps between this voltage and the successive second and third gray voltages.

As shown in FIGS. 3A to 3D, it is apparent that the contrast ratio of 0 volt is better than that of 1.7 volts in all viewing angles.

FIGS. 4A to 4D are graphs illustrating the luminance as a function of the viewing angle θ for azimuthal angles Φ of 0°, 45°, 90° and 135°, respectively. The two curves are those when the applied first gray voltage is 0 volt (a) and 1.7 volts (b).

As shown in FIGS. 4A to 4D, it is apparent that the luminance of 1.7 volts is higher than that of 0 volt in all viewing angles. High luminance in the first gray representing the darkest state means high light leakage in the black state.

For azimuthal angles of 0° and 90°, the luminance curve of 1.7 volts exhibits high peaks near ±50° while that of 0 volt showing no peak. For azimuthal angles of 45° and 135°, both the luminance curves of 0 volt and 1.7 volts show high peaks, but the luminance of 1.7 volts is still larger than that of 0 volt. This high luminance of 1.7 volts may result in high contrast.

Figure 5A:
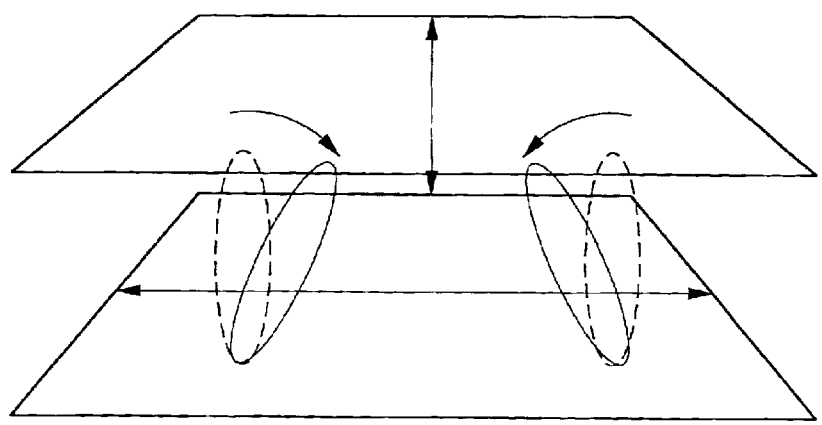
FIGS. 5A and 5B show a lateral view in one polarizing direction and a front view of a liquid crystal display, respectively, when liquid crystal molecules tilt in the other polarizing direction.
Figure 5B:
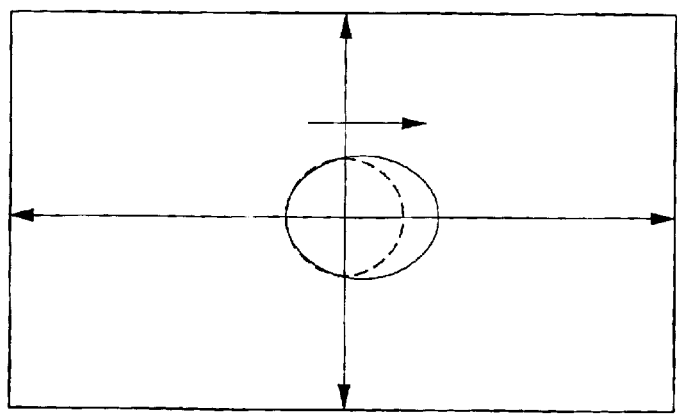
Figure 5C:
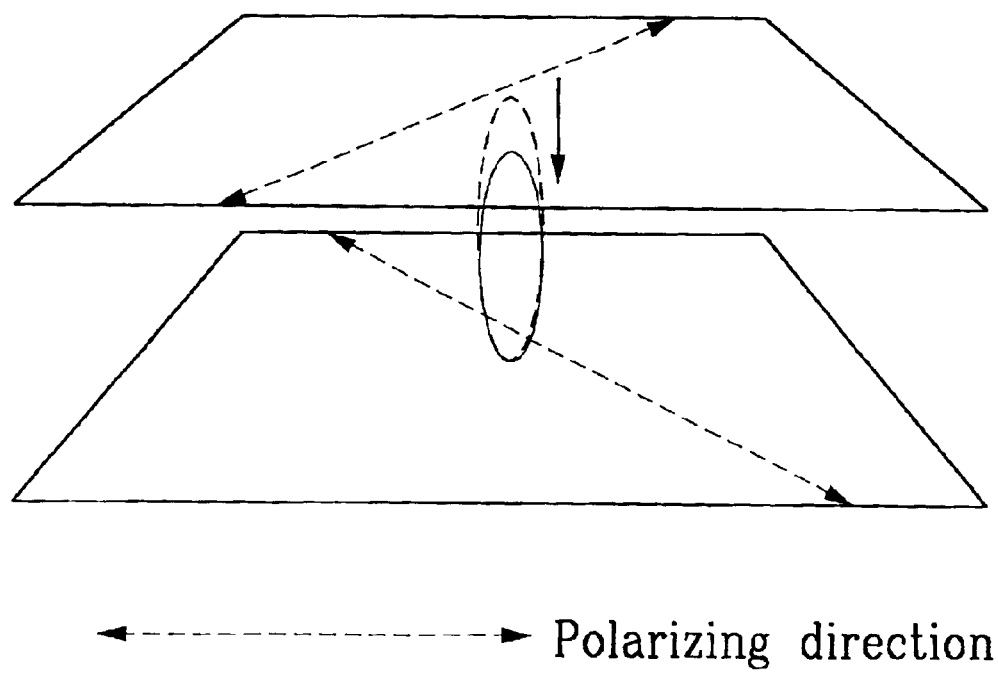
FIGS. 5C and 5D show a lateral view in the tilt direction of liquid crystal molecules and a front view of a liquid crystal display, respectively, when the tilt direction of the liquid crystal molecules makes 45 degrees with both polarizing direction.
Figure 5D:
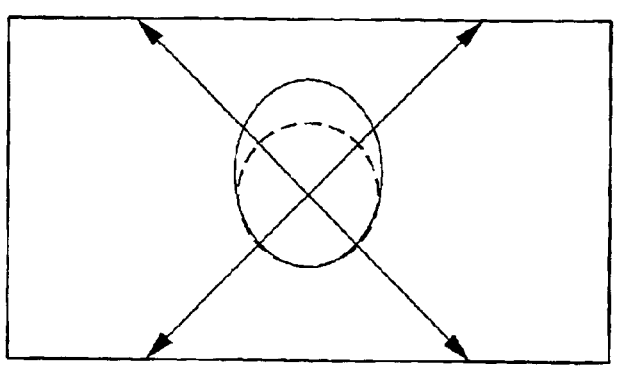
Figure 6A:
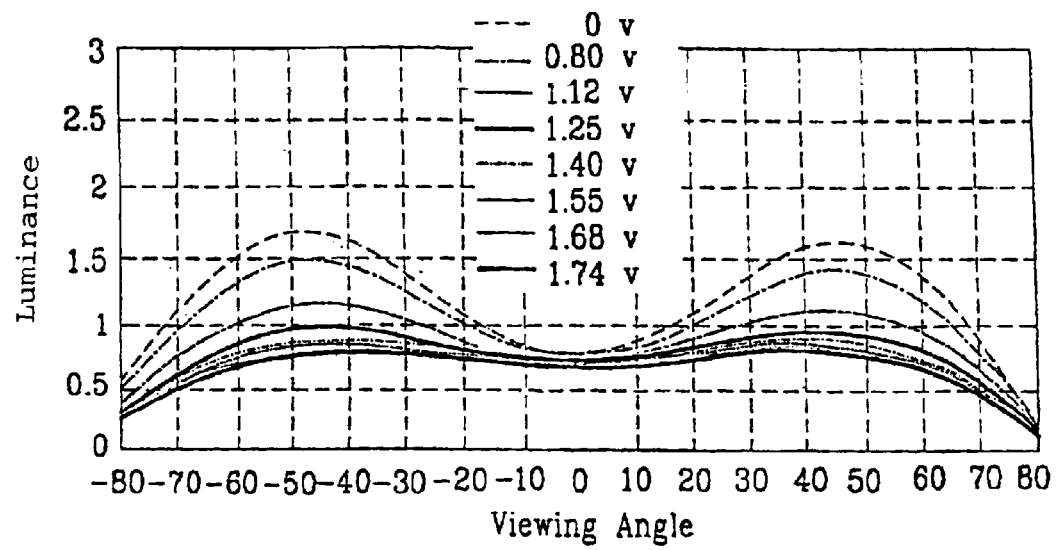
FIGS. 6A to 6D are graphs illustrating the luminance as a function of the viewing angle θ for the various voltages of the first gray when the azimuthal angles Φ are 0°, 45°, 90° and 135°, respectively.
Figure 6B:
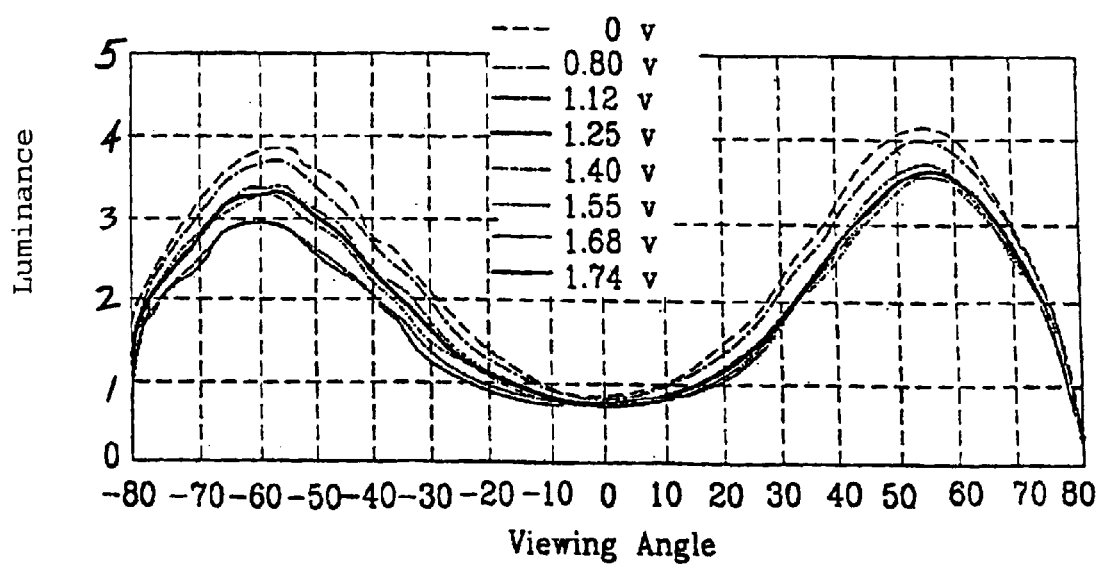
Figure 6C:
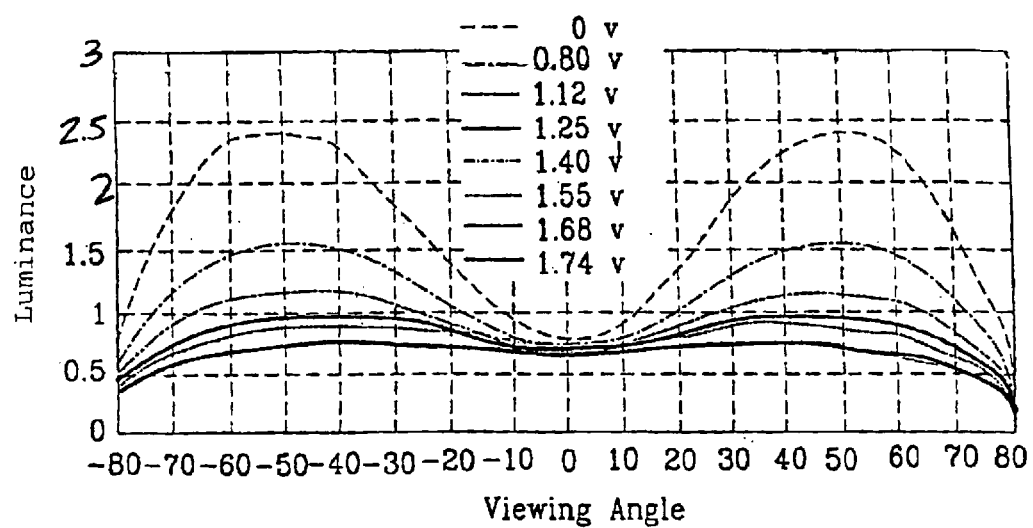
Figure 6D:
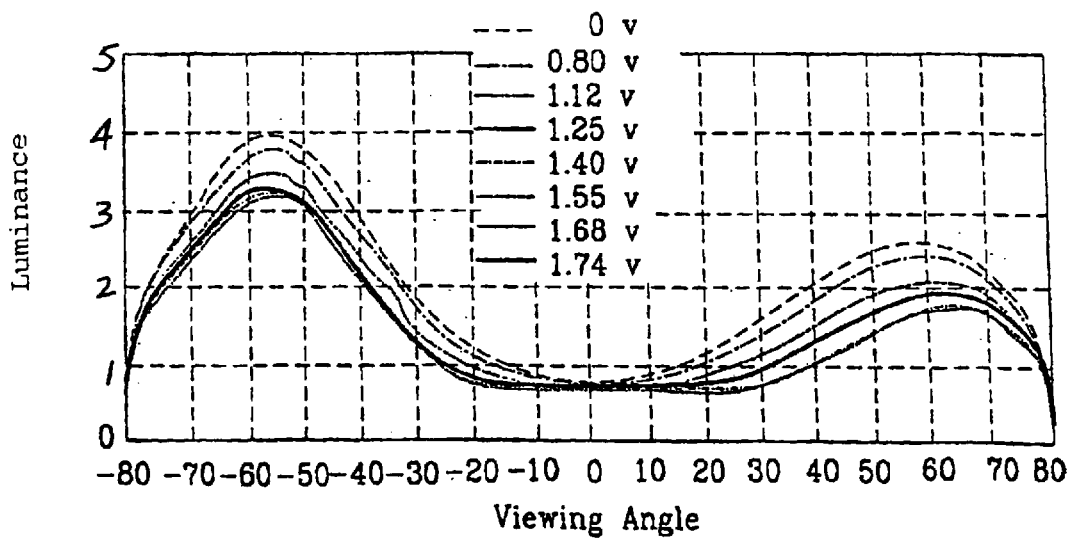
Figure 7A:
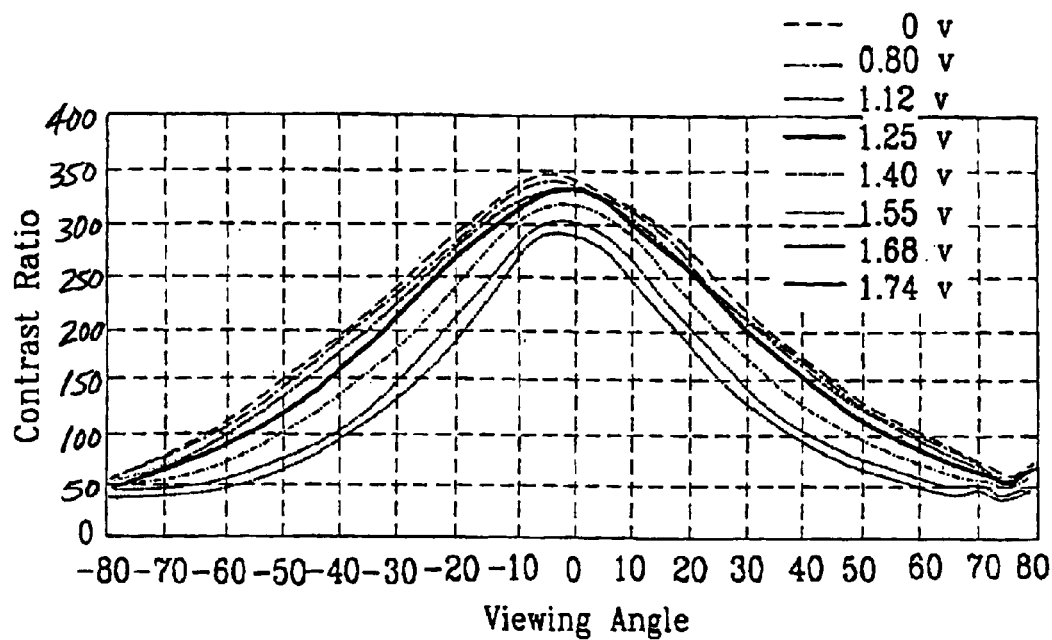
FIGS. 7A to 7D are graphs illustrating the contrast ratio as a function of the viewing angle θ for the various voltages of the first gray when the azimuthal angles Φ are 0°, 45°, 90° and 135°, respectively.
Figure 7B:
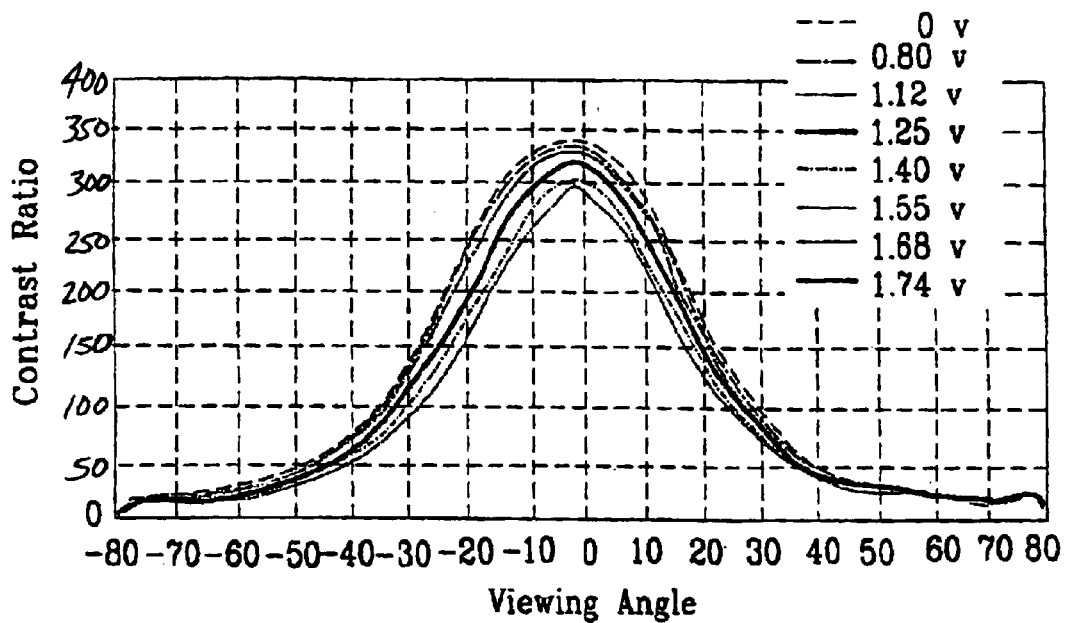
Figure 7C:
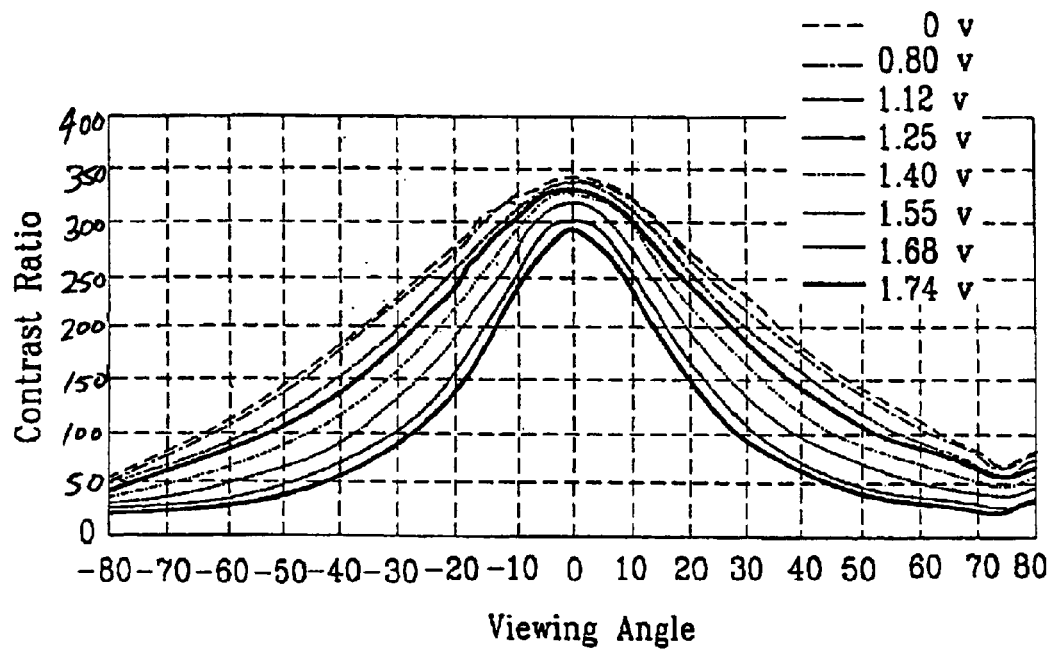
Figure 7D:
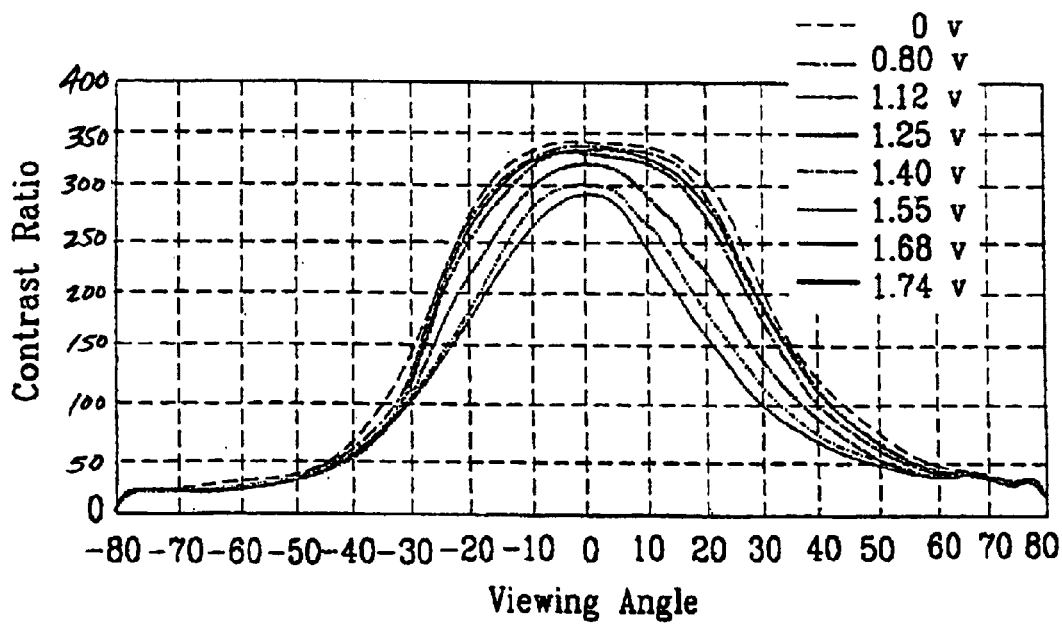

FIGS. 5A to 5D show liquid crystal molecules applied with a voltage of 1.7 volts. FIGS. 5A and 5B are lateral views in one polarizing direction and a front view of a liquid crystal display, respectively, when liquid crystal molecules tilt in the other polarizing direction. FIGS. 5C and 5D are lateral views in the tilt direction of liquid crystal molecules and a front view of a liquid crystal display, respectively, when the tilt direction of the liquid crystal molecules makes 45 degrees with both polarizing direction.

Although the threshold voltage of a liquid crystal display is higher than 1.7 volts, the liquid crystal molecules are minutely moved. The retardation in the lateral view is large compared with that in the front view, as shown in FIGS. 5A to 5D. Accordingly, the brightness in the front view is low while that in the lateral view is relatively high. In addition, the retardation variation in the lateral view when the tilt direction makes 45 degrees with the polarizing directions is smaller than that when the tilt direction is parallel to the polarizing direction, as shown in FIGS. 5A and 5C, and this causes small contrast variation.

FIGS. 6A to 6D are graphs illustrating the luminance as a function of the viewing angle θ for various voltages of the first gray when the azimuthal angles Φ are 0°, 45°, 90° and 135°, respectively, and FIGS. 7A to 7D are graphs illustrating the contrast ratio as function of the viewing angle θ for various voltages of the first gray when azimuthal angles Φ are 0°, 45°, 90° and 135°, respectively.

As the first gray voltage decreases, the luminance decreases while the contrast ratio increases. The contrast ratio curve of the applied voltage of 0.8 volts shows the same as that of zero voltage.

Figure 8:
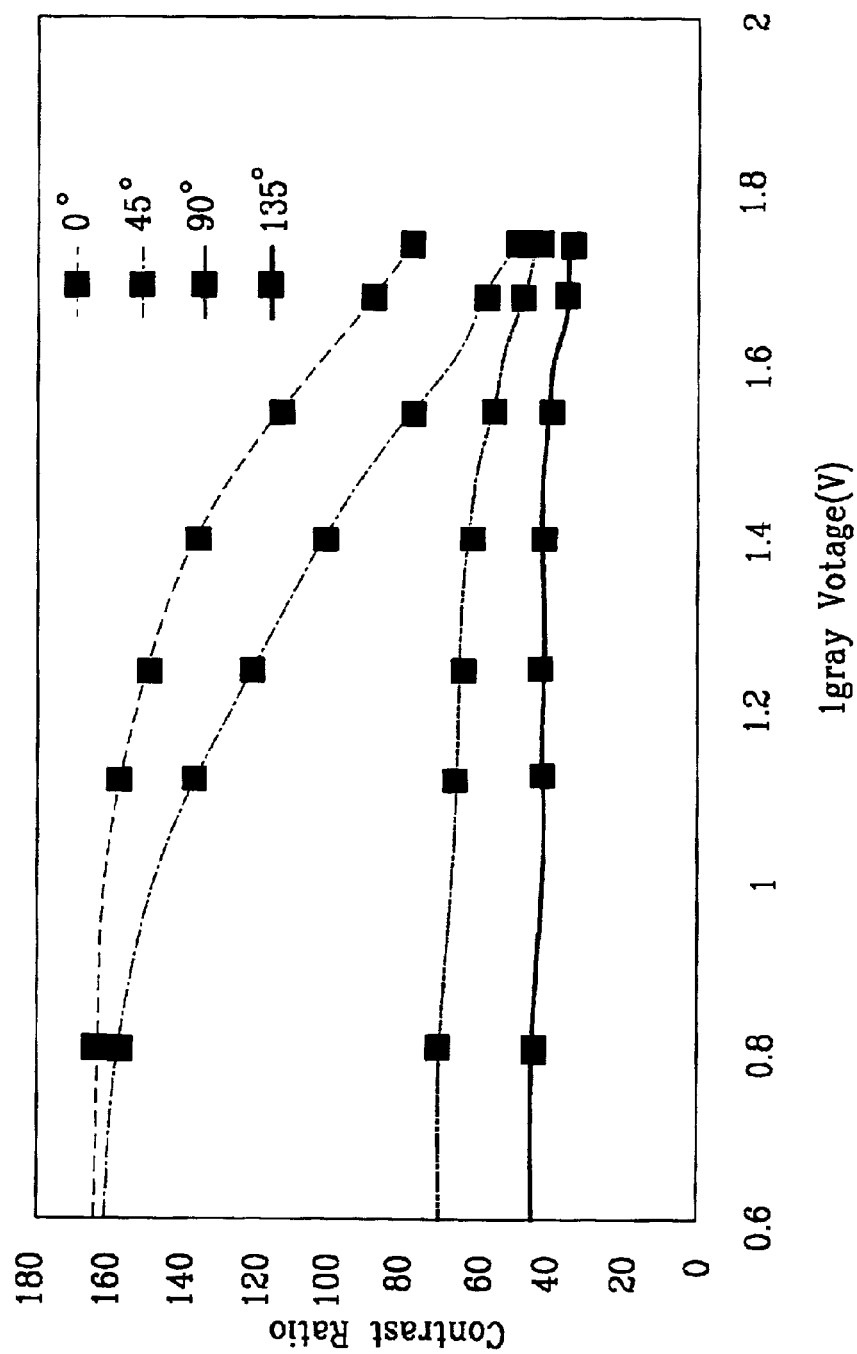
FIG. 8 is a graph illustrating the contrast ratio as a function of the first voltage for various azimuthal angles when the viewing angle θ is 45°.

FIG. 8 is a graph illustrating the contrast ratio as a function of the applied voltage for several azimuthal angles when the viewing angle θ is 45°. As shown in FIG. 8, contrast ratio increases as the applied voltage decreases for all azimuthal angles.

Figure 9:
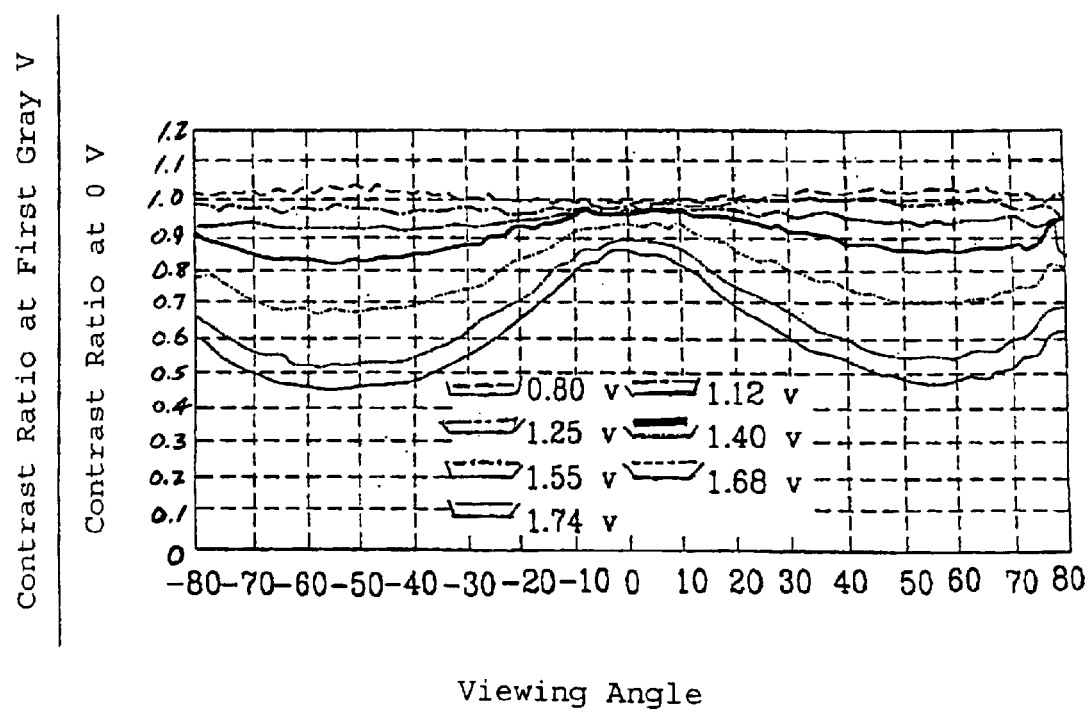
FIG. 9 is a graph illustrating the contrast ratio as a function of the viewing angle for the various voltages of the first gray with reference to the contrast ratio of 0 volt being applied.

FIG. 9 is a graph illustrating the contrast ratio of a PVA (Patterned Vertically Aligned) LCD in the polarizing direction as a function of the viewing angle for various applied voltages with reference to that of zero volt.

As shown in FIG. 9, the variation of the contrast ratio depending on the viewing angle becomes larger as the applied voltage becomes higher. It is understood that the applied voltage equal to or smaller than 1.4 volts gives the contrast ratio equal to or higher than 0.8 in all viewing directions. However, this value may be varied depending on the type of LCD or the kind of liquid crystal material.

The light leakage is larger in the diagonal direction than in the polarizing direction even when applying 0 volt as the first gray voltage, and this may be compensated by adjusting the retardation value of a phase compensation film or changing a cell gap.

In order to review the effect of the present invention, the contrast ratio and the luminance of the white color of an LCD according to the present invention were compared with those of conventional liquid crystal displays.

FIGS. 10A to 10D are graphs showing contrast ratio as a function of the viewing angle θ for an LCD according to the first embodiment of the present invention, and conventional PVA, MVA (Multi-domain Vertically Aligned) and CE (Coplanar Electrode) mode LCDs, when the azimuthal angles Φ are 0°, 45°, 90° and 135°, respectively.

FIGS. 11A to 11D are graphs showing the luminance as a function of the viewing angle θ for an LCD according to the first embodiment of the present invention, and conventional PVA, MVA and CE mode LCDs when the azimuthal angles Φ are 0°, 45°, 90° and 135°, respectively.

A PVA mode LCD is a vertically aligned mode LCD having openings as domain-defining members, an MVA mode LCD is also a vertically aligned mode LCD but having projections as domain-defining members, and a CE mode LCD has pixel electrodes and a common electrode provided in the same panel.

Figure 10A:
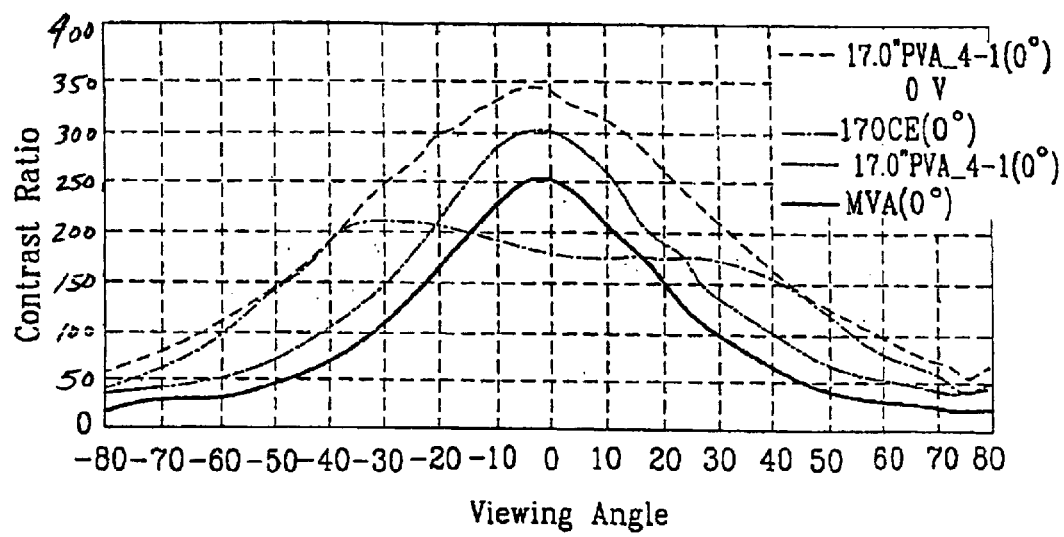
FIGS. 10A to 10D are graphs showing the contrast ratio of the first embodiment of the present invention as a function of the viewing angle θ along with those of the conventional PVA (Patterned Vertical Aligned), MVA (Multi-domain Vertical Aligned) and CE (coplanar electrode) mode LCDs when the azimuthal angles Φ are 0°, 45°, 90° and 135°, respectively.
Figure 10B:
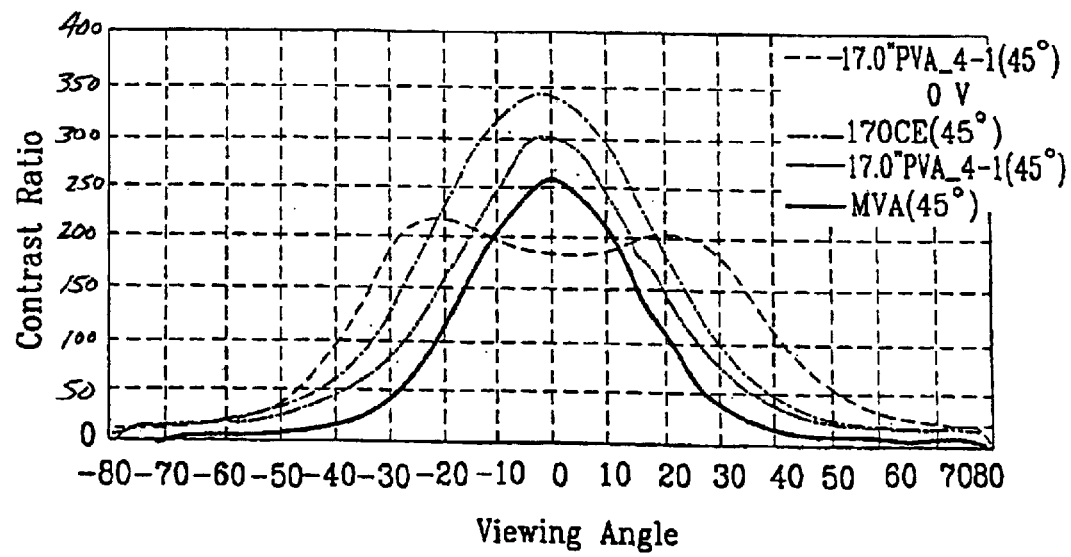
Figure 10C:
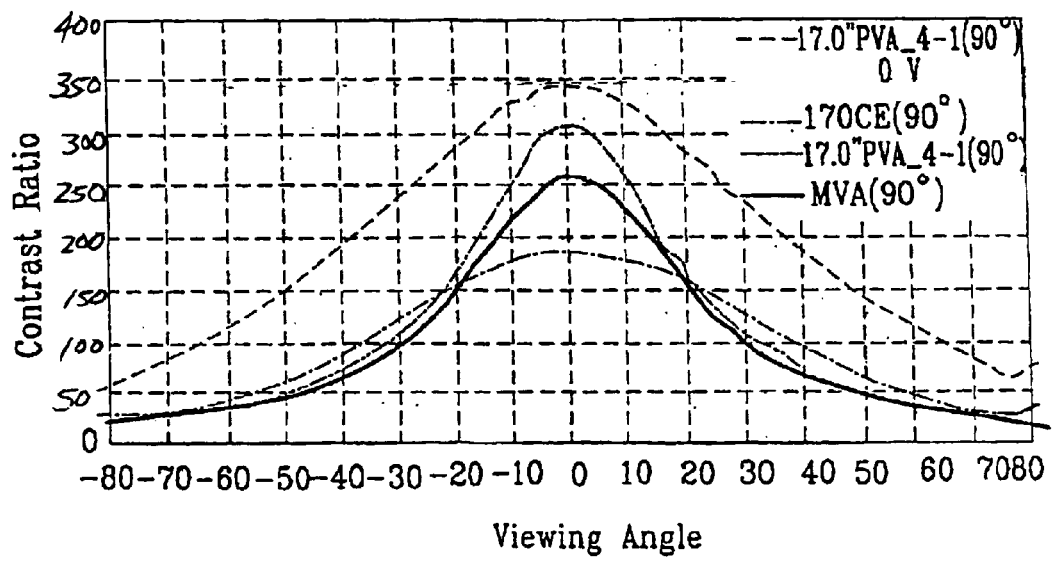
Figure 10D:
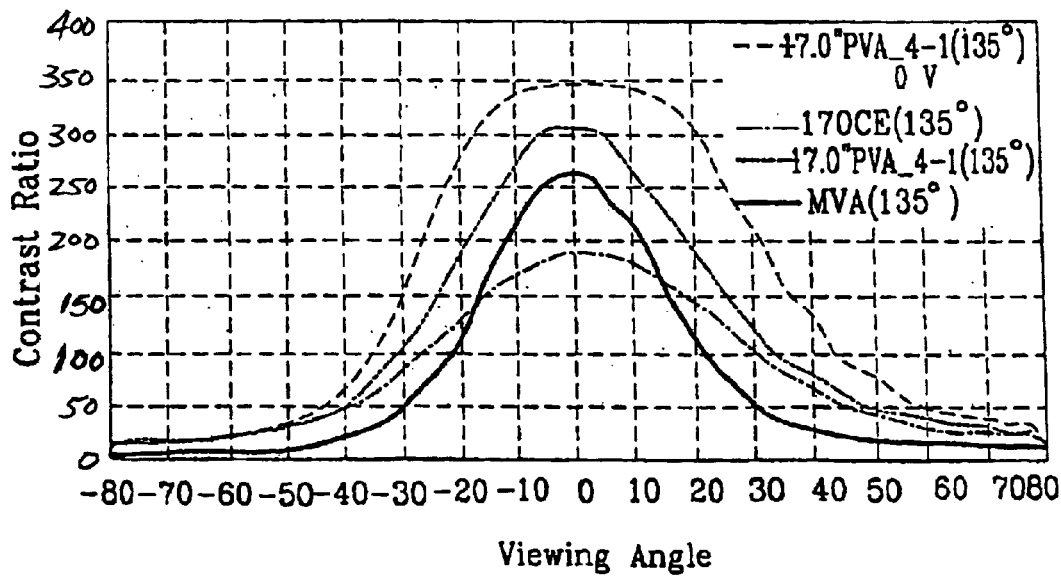
Figure 11A:
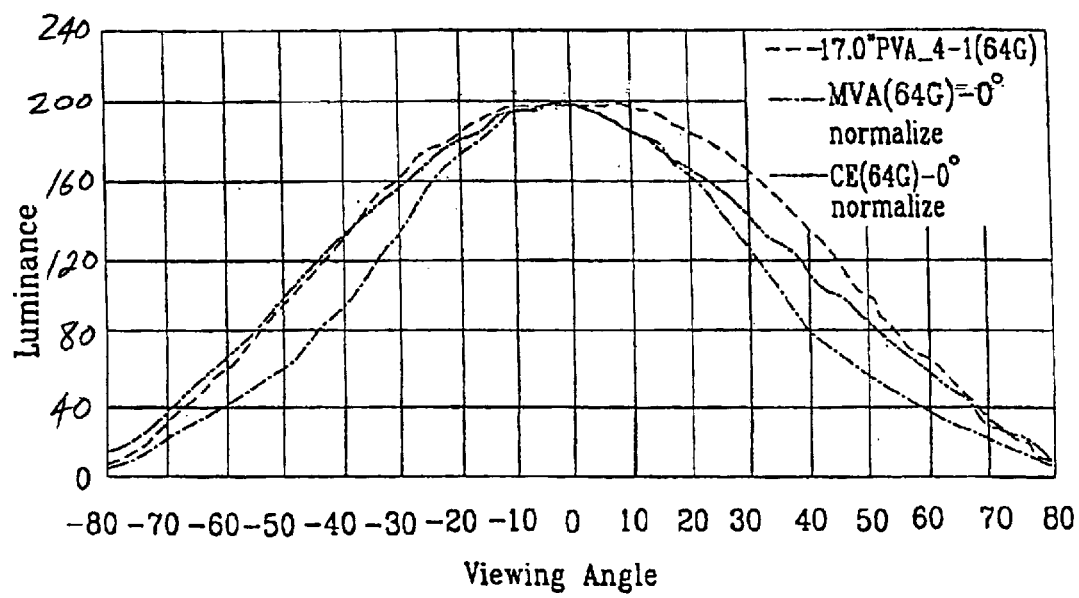
FIGS. 11A to 11D are graphs showing the luminance of the first embodiment of the present invention as a function of the viewing angle θ along with those of the conventional PVA, MVA and CE mode LCDs when the azimuthal angles Φ are 0°, 45°, 90° and 135°, respectively.
Figure 11B:
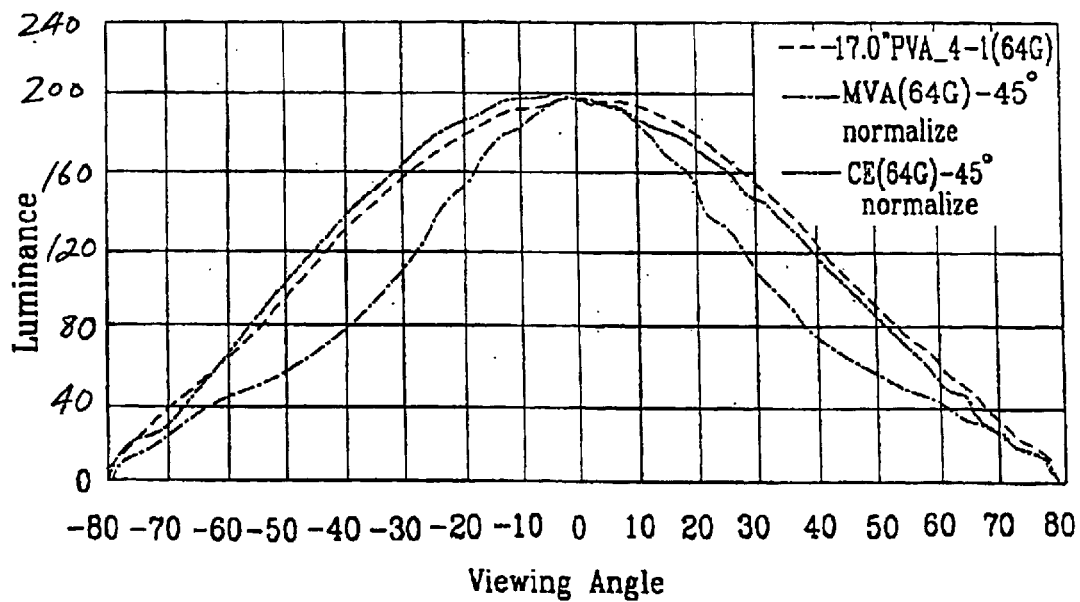
Figure 11C:
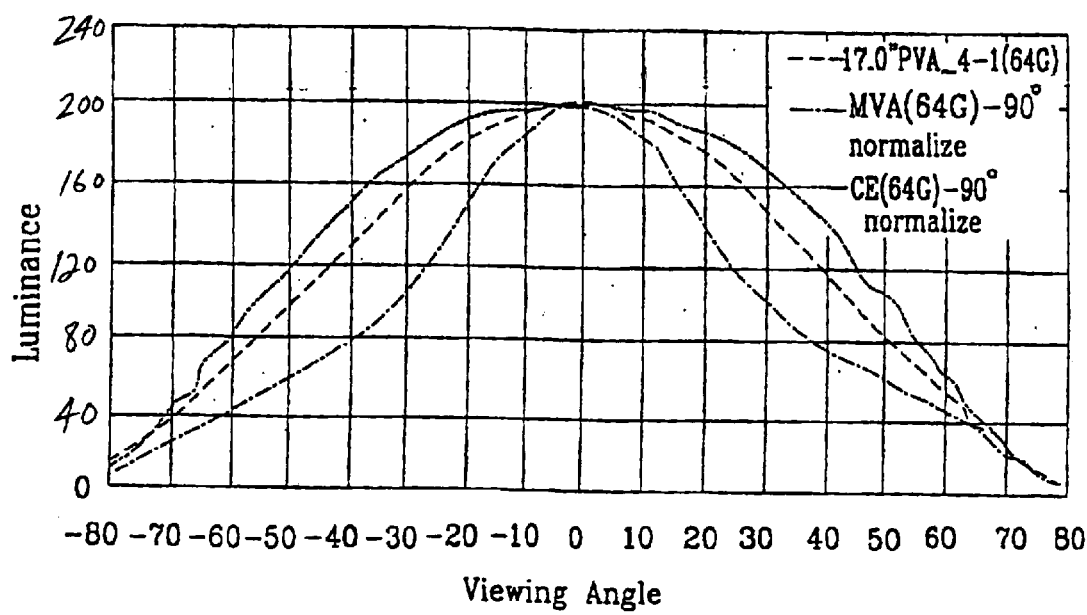
Figure 11D:
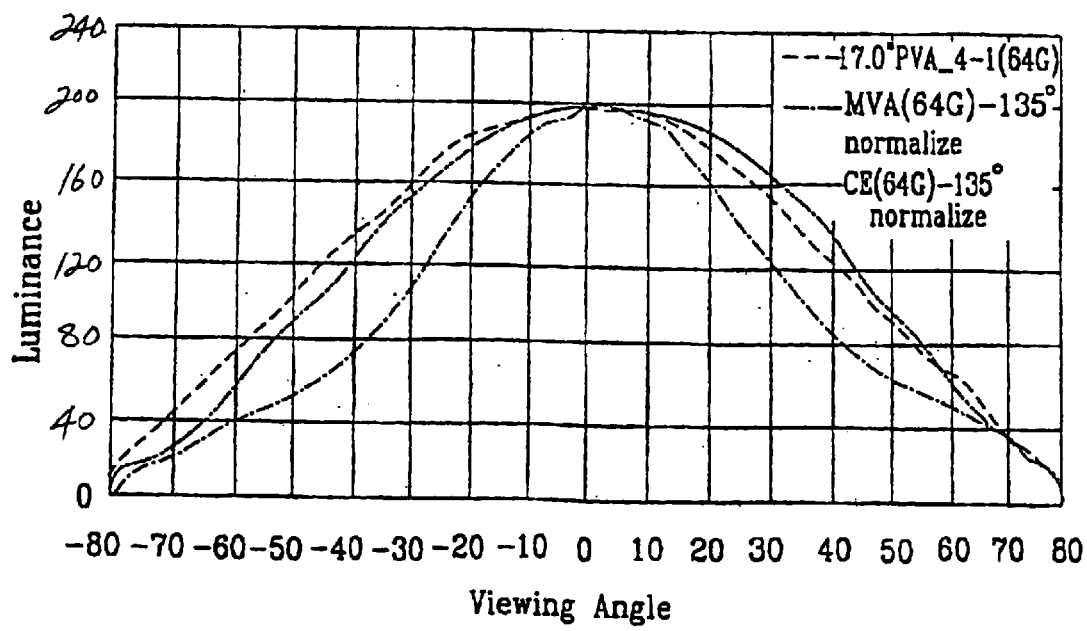

As shown in FIGS. 10A to 10D, the contrast ratio of the liquid crystal display according to the embodiment of the present invention is superior in all viewing angles except for the case of the azimuthal angle of 45 degrees shown in FIG. 10B.

As shown in FIGS. 11A to 11D, the luminance of the white color of the liquid crystal display according to the embodiment of the present invention is superior to the MVA mode and is similar or slightly superior to the CE mode.

Next, the color reproduction will be described.

Figure 12:
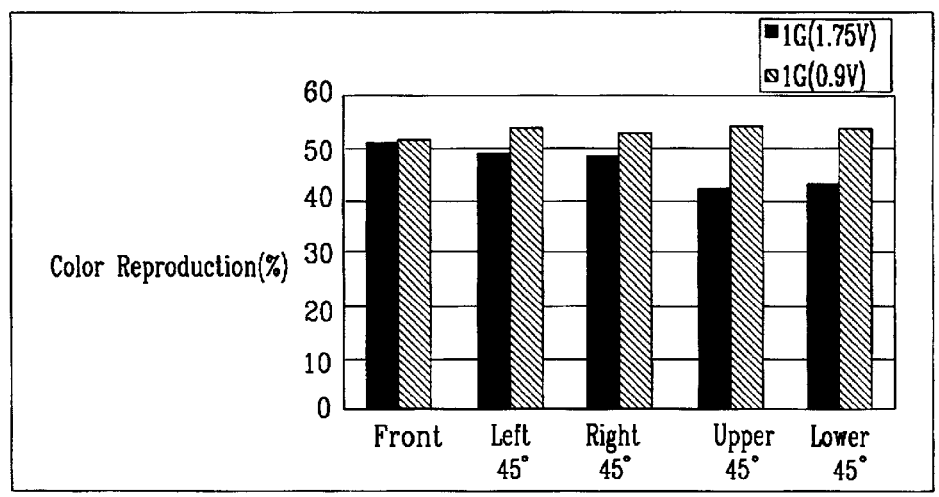
FIG. 12 is a graph illustrating the color reproductions in the front view and the side views (θ=45°) for the first gray voltages of 1.75 volts and 0.9 volts.

FIG. 12 and Table 1 illustrate the color reproductions in the front view and the lateral views (θ=45°) when the applied voltage is 1.75 volts and 0.9 volts.

TABLE 1

| First Gray Voltage | Front | Left 45° | Right 45° | Top 45° | Bottom 45° |
|---|---|---|---|---|---|
| 1.75 V | 51.3 | 49.2 | 48.2 | 42.0 | 42.8 |
| 0.9 V | 51.8 | 53.8 | 52.9 | 54.1 | 53.5 |

As shown in Table 1 and FIG. 12, the color reproduction of 1.75 volts is similar to that of 0.9 vots in the front view, while severely deteriorated in the lateral view. This can be understood in the same manner as the decrease of the contrast ratio and the increase of luminance in the lateral view, as described above. For example, when blue color is intended to display, the red and the green pixels are applied with the first gray voltage to be dark and only the blue pixel is applied with higher gray voltage to be brightened. However, leaked light in the red and the green pixels applied with the first gray voltage is mixed to distort the display of pure blue color.

Figure 13A:
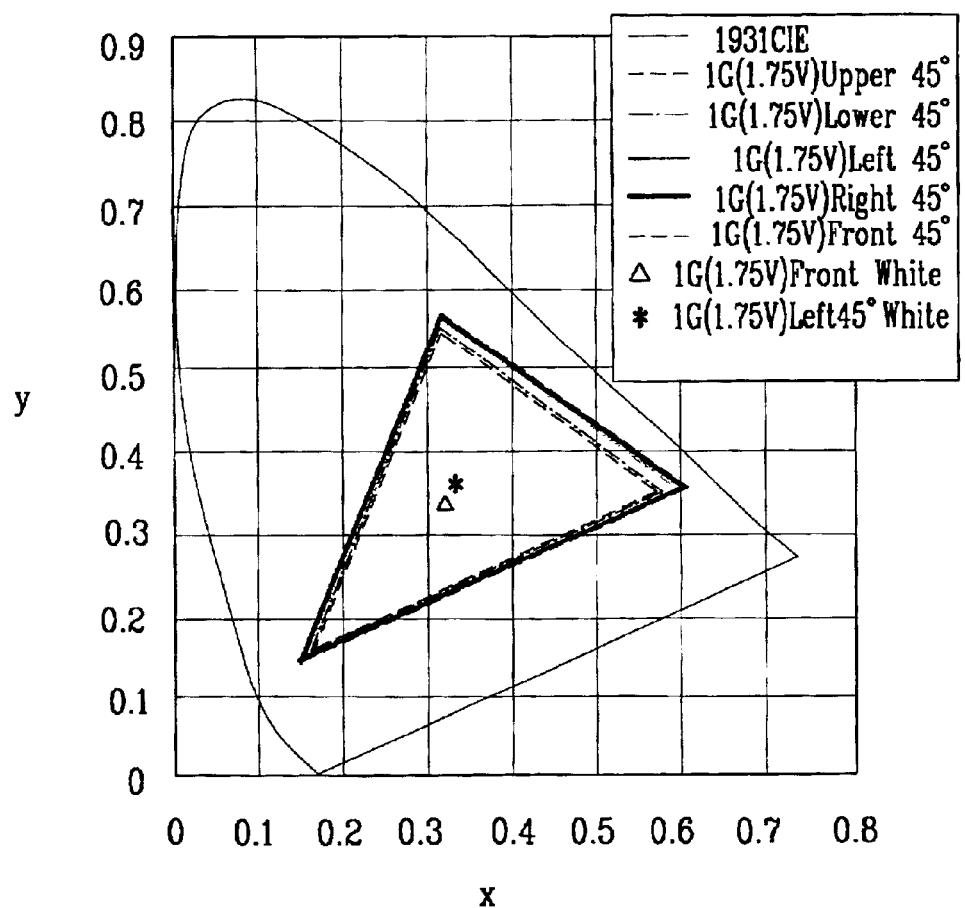
FIGS. 13A and 13B are color-coordinate diagram for the first gray voltages of 1.75 volts and 0.9 volts.
Figure 13B:
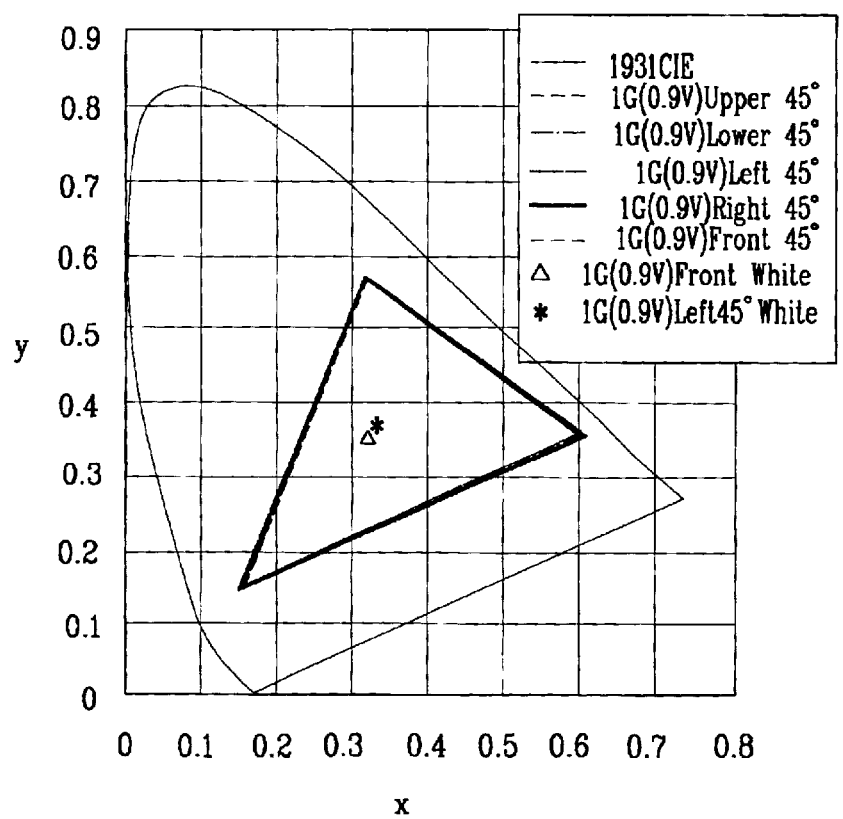

FIGS. 13A and 13B are color-coordinate graphs when the first gray voltage is 1.75 volts and 0.9 volts, respectively.

As described above, when displaying the blue color, the light leakages in the red and the green pixels make color-coordinate to move toward the white color. In this way, when displaying the red or the green color, the light leakages in the other color pixels also make color-coordinate to move toward the white color, thereby diminishing the size of a triangle connecting the red, the green and the blue colors. The decreases of the size of the triangle connecting the red, the green and the blue color means that displayable color range is small, thereby color reproduction is deteriorated.

Accordingly, to improve color reproduction, the first gray voltage should be smaller than a value as taught by the present invention.

As described above, the contrast ratio and the color reproduction can be improved by lowering the first gray voltage, so that the image quality of a liquid crystal display is improved.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:

a first panel having inner and outer surfaces;

a second panel facing the first panel and having inner and outer surfaces;

a pixel electrode provided on the inner surface of the first panel;

a common electrode provided on the inner surface of the second panel; and a liquid crystal layer between the first and the second panels, wherein the liquid crystal layer is vertically aligned in the absence of an electric field, and wherein a voltage value of a first gray representing the darkest state applied between the pixel electrode and the common electrode is within a voltage range for yielding a quotient greater than or equal to about 0.8 and less than about 1 for all viewing angles when a contrast ratio at the voltage value is divided by a contrast ratio when the voltage applied between the pixel electrode and the common electrode is zero.

2. The liquid crystal display of claim 1 further comprising first and second polarizers disposed on respective outer surfaces of the first and the second panels.

3. The liquid crystal display of claim 1, further comprising a domain-defining member for restricting the tilt directions of molecules in the liquid crystal layer, provided in one or both of the first and the second panels.

4. The liquid crystal display of claim 3, wherein the domain-defining member is openings in the pixel electrode or the common electrode.

5. The liquid crystal display of claim 4, wherein the voltage value of the first gray is equal to or lower than 1.4 V.

6. The liquid crystal display of claim 5, wherein the openings are provided in both the pixel electrode and the common electrode.

7. The liquid crystal display of claim 6, wherein regions divided by the openings are classified into four domains depending on the tilt directions of the liquid crystal molecules.

8. A liquid crystal display comprising:
a first and second panel, each having inner and outer surfaces, with inner surfaces facing each other;
a pixel electrode disposed on the inner surface of the first panel and a common electrode disposed on the inner surface of the second panel; and
a liquid crystal layer having crystal molecules disposed between the first and second panels, wherein
the liquid crystal layer is vertically aligned in the absence of an electric field,
a domain defining member is formed in the common electrode and the pixel electrode for restricting the tilt directions of the crystal molecules, the domain defining member including a longitudinal opening in the pixel electrode dividing a portion of the pixel electrode into two partitions and an aperture in the common electrode having at least one longitudinal portion dividing one of the two partitions when the aperture in the common electrode is projected on the pixel electrode, and
the voltage value of a first gray is equal to or lower than 1.4 V.

9. The display according to claim 8, wherein the domain defining member further includes a plurality of openings in the pixel electrode and in the common electrode arranged laterally along a longitudinal direction, with at least one opening disposed in a direction transverse to the longitudinal direction.

10. A liquid crystal display comprising:
a first panel having inner and outer surfaces;
a second panel facing the first panel and having inner and outer surfaces;
a pixel electrode provided on the inner surface of the first panel;
a common electrode provided on the inner surface of the second panel; and
a liquid crystal layer between the first and the second panels, wherein
the liquid crystal layer is vertically aligned in the absence of an electric field,
the pixel electrode and the common electrode each include a plurality of openings for restricting tilt directions of molecules of the liquid crystal layer, the pixel electrode including an opening dividing an upper portion of the pixel electrode into two partitions and the common electrode including an opening having at least two portions, each of the at least two portions dividing a respective one of the two partitions when the opening in the common electrode is projected on the pixel electrode, and
the voltage value of a first gray is equal to or lower than 1.4 V.

11. The liquid crystal display according to claim 10, wherein the opening dividing the upper portion of the pixel electrode and the at least two portions extend in the same direction.

12. The liquid crystal display according to claim 10, wherein the pixel electrode includes a plurality of openings dividing a lower portion of the pixel electrode into a plurality of partitions.

13. The liquid crystal display according to claim 12, wherein the common electrode includes at least two openings for respectively dividing at least two of the plurality of partitions.

14. The liquid crystal display according to claim 12, wherein the common electrode includes at least two openings overlapping at least two of the plurality of partitions for respectively forming at least two edges of the lower portion of the pixel electrode when the at least two openings in the common electrode are projected on the pixel electrode.

15. The liquid crystal display according to claim 10, wherein the opening in the common electrode having at least two portions includes a third portion perpendicular to the at least two portions forming an edge of the pixel electrode when the opening in the common electrode is projected on the pixel electrode.

* * * * *